UNITED STATES PATENT OFFICE.

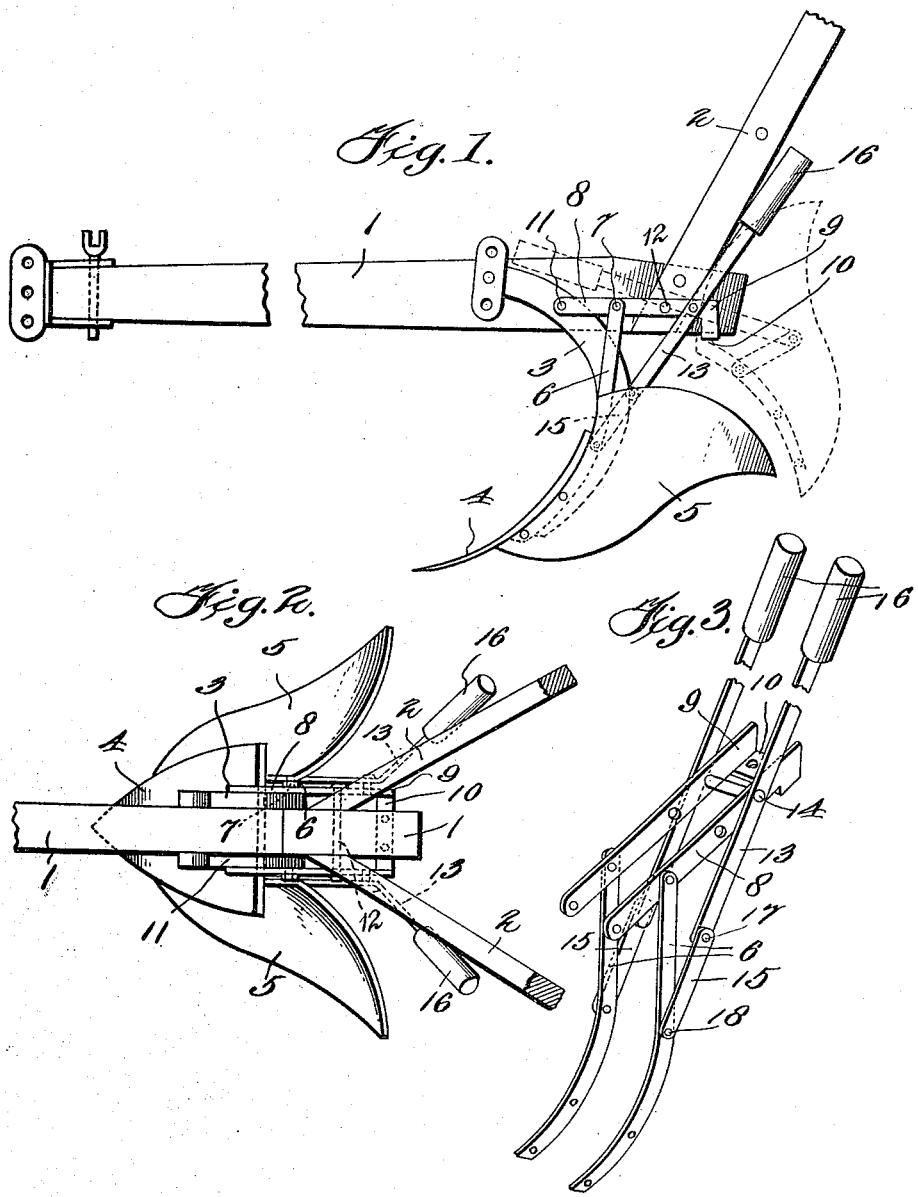

HENRY L. GAINES, OF GAINESVILLE, GEORGIA, ASSIGNOR OF ONE-HALF TO HILLYER M. COOPER, OF GAINESVILLE, GEORGIA.

PLOW.

1,194,166.   Specification of Letters Patent.   Patented Aug. 8, 1916.

Application filed February 9, 1915. Serial No. 7,082.

*To all whom it may concern:*

Be it known that I, HENRY L. GAINES, a citizen of the United States, residing at Gainesville, in the county of Hall and State of Georgia, have invented certain new and useful Improvements in Plows; and I do hereby declare the following to be a full, clear, and exact description of the invention, such as will enable others skilled in the art to which it appertains to make and use the same.

This invention relates to improvements in plows.

The object of the present invention is to provide a simple, practical and efficient device in the form of an attachment adapted to be readily applied to single foot plows either one horse or two horse and equipped with a pair of pivoted side wings adapted to be used simultaneously to form a center breaking plow or independently to form a turning or hillside plow and capable also of being both elevated to an inoperative position to enable the plow to be employed as a subsoiler.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

Figure 1 is a side elevation of a plow provided with an attachment constructed in accordance with this invention. Fig. 2 is a plan view of the same, the plow beam and the plow handle being broken away, Fig. 3 is a detail perspective view illustrating the construction for hingedly mounting the side wings.

Like numerals of reference designate corresponding parts in all the figures of the drawing.

In the accompanying drawing in which is illustrated the preferred embodiment of the invention, 1 designates a plow beam equipped with plow handles 2 and provided with a foot comprising a curved standard 3 and a blade or shovel 4.

The plow may be of any preferred construction as the attachment is designed for various plows of this general type. The plow is equipped with a pair of side wings 5 riveted or otherwise secured to a movable bar or member 6 which is pivoted at its upper end by a bolt 7 or other suitable fastening device to one side or bar 8 of a frame or support 9. The wing member or bar 6 extends upwardly from the top of the wing which is arranged at the side of the center blade or shovel 4 as clearly illustrated in Fig. 2 of the drawings.

The support 9 is approximately U-shaped being composed of the sides or bars 8 and a rear transverse connecting portion 10 extending beneath the rear end of the plow beam and having upturned terminal portions which space the sides or bars 8 from the lower face of the plow beam. The sides or bars 8 of the support are secured to the plow by means of bolts 11 and 12 or other suitable fastening devices.

The front bolt 11 preferably passes through the plow beam and the standard 3 and the bolt 12 which is located at the rear portion of the support preferably extends through the plow handles but these fastening means may be arranged at any other desired point as will be readily understood.

The pivot bolt 7 which connects the wing bar or member to the support enables the wing to swing upwardly from the position illustrated in full lines in Fig. 1 of the drawing to the elevated position shown in dotted lines in the said figure to arrange the wings for use to elevate them to an inoperative position. By this construction either one or both of the wings may be employed and when both wings are arranged for simultaneous operation, a center breaking plow is formed. A turning or hillside plow may be formed by raising one of the wings and leaving the other in its lower position and either a right or left hand plow may be instantly formed.

The wings are manipulated by means of a combined operating and locking device comprising levers 13 fulcrumed at an intermediate point on the rear portion of the side bars of the support by means of a transverse bolt 14 piercing the levers 13 at a point intermediate of their ends and passing through the sides of the frame or support 9 and also through the plow beam but the levers may be fulcrumed in any other desired manner. The lower arms of the operating and locking levers are connected by short links 15 with the wing by means of rivets or other suitable fastening devices which secure the links 15 to the lower ends of the levers and to the wing standard.

The upper arms of the levers are equipped with weighted grip portions 16 and are adapted to be swung forwardly to elevate the wings and rearwardly to lower the wings to their operative position and to lock them therein. When the lower arms of the operating levers are at the limit of their forward movement, the upper pivot 17 of the links 15 are carried to a point in advance of a line intersecting the lower pivot 18 and the pivot bolt 14. This forms a lock and rigidly maintains the wing in operative position. When the upper arm of either lever is swung forwardly, the lock is broken and the wing to which such lever is connected is elevated. The weighted grips 16 are designed to be sufficient to maintain the wings in elevated position out of operation. The operating levers are arranged within easy reach and either of the wings may be instantly thrown into and out of operation.

What is claimed is:—

1. The combination with a plow having a center foot, of a pair of wings located at opposite sides of the plow and provided with upwardly extending bars pivoted to the plow to permit the wings to swing upwardly and downwardly in a vertical direction into and out of operative position with relation to the foot, a pair of independently movable levers and links connecting the levers with the wings and arranged to form a lock for holding the wings in operative position, said levers and links being arranged at an angle to the bars of the wings when the latter are in position for use.

2. The combination with a plow having a center foot, of a pair of wings located at opposite sides of a plow and provided with upwardly extending standards pivoted to the plow, levers fulcrumed on the plow at opposite sides thereof at points intermediate of the ends of said levers, links connecting the lower arms of the levers with the wings, and weights carried by the upper arms of the levers and adapted to counterbalance and support the wings in an elevated position.

3. An attachment for plows comprising a central foot, a support having spaced sides and a connecting portion and adapted to embrace the rear portion of a plow beam, of side wings provided with members pivotally connected to the sides of the said support, said side wings being adapted to swing into and out of coöperative relation with the said foot, operating levers fulcrumed on the support, and links connecting the operating levers with the wings.

In testimony whereof I affix my signature in presence of two witnesses.

HENRY L. GAINES.

Witnesses:
R. W. SMITH,
C. E. SMITH.

Copies of this patent may be obtained for five cents each, by addressing the "Commissioner of Patents, Washington, D. C."